United States Patent [19]
Morimoto et al.

[11] Patent Number: 5,420,855
[45] Date of Patent: May 30, 1995

[54] MULTI-PORT TIME SWITCH ELEMENT

[75] Inventors: Akio Morimoto; Hiroshi Nakaide, both of Kawasaki, Japan

[73] Assignee: Fujitsu Limited, Kawasaki, Japan

[21] Appl. No.: 185,753

[22] Filed: Jan. 21, 1994

Related U.S. Application Data

[63] Continuation of Ser. No. 776,987, Oct. 15, 1991, abandoned.

[30] Foreign Application Priority Data

Oct. 19, 1990 [JP] Japan .................................. 2-281362

[51] Int. Cl.$^6$ ........................................... H04Q 11/04
[52] U.S. Cl. ................... 370/58.1; 370/58.2; 370/59; 370/68; 340/825.03
[58] Field of Search ................ 370/58.1, 59, 66, 68, 370/58.2, 61; 340/825.03

[56] References Cited

U.S. PATENT DOCUMENTS

| | | | |
|---|---|---|---|
| 3,678,205 | 7/1972 | Cohen et al. | 370/66 |
| 4,320,501 | 3/1982 | Le Dieu et al. | 370/68 X |
| 4,941,141 | 7/1990 | Hayano | 370/68 X |

*Primary Examiner*—Douglas W. Olms
*Assistant Examiner*—Russell W. Blum
*Attorney, Agent, or Firm*—Greer, Burns & Crain, Ltd.

[57] ABSTRACT

A multi-port time switch element for cross-connecting an n-channel multiplexed data includes m input ports for receiving m n-channel multiplexed data, a memory part for alternately writing and reading the n-channel multiplexed data, m selectors for writing and reading the n-channel multiplexed data so that each of the m selectors receives m×n data read from the memory part and selects one of the m×n data n times in an arbitrary sequence to output an n-channel multiplexed data, and m output ports for outputting the m n-channel multiplexed data read from the m selectors.

8 Claims, 7 Drawing Sheets

FIG. 1A PRIOR ART

| CH1 | CH2 | CH3 | CH4 | CH5 | CH6 | CH7 | CH8 |

FIG. 1C PRIOR ART

| CH2 | CH4 | CH1 | CH8 | CH5 |

FIG. 1B PRIOR ART

| ADD | MEM |
|---|---|
| 0 | CH 1 |
| 1 | CH 2 |
| 2 | CH 3 |
| 3 | CH 4 |
| 4 | CH 5 |
| 5 | CH 6 |
| 6 | CH 7 |
| 7 | CH 8 |

MULTI-PORT TIME SWITCH ELEMENT

This is a continuation of application Ser. No. 07/776,987, filed on Oct. 15, 1991 now abandoned.

BACKGROUND OF THE INVENTION

The present invention generally relates to multi-port time switch elements, and more particularly to a multi-port time switch element for use in a transmission equipment having a cross-connect function.

Recently, transmission equipments do not simply make a multiplexing, but also have the so-called cross-connect function which outputs a multiplexed signal to an arbitrary port in predetermined units. A time switch is popularly used to realize this cross-connect function.

Figure 1A:
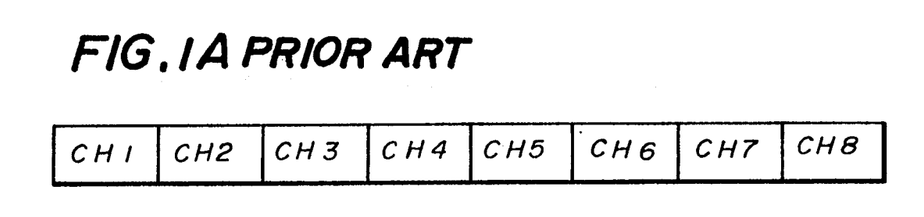
FIGS. 1A through 1C are diagrams for explaining a cross-connecting of eight channels of data.

Conventionally, the cross-connecting of eight channels of data, for example, is carried out as follows. That is, channels data CH1, CH2, CH3, ... shown in FIG. 1A are successively written into a memory MEM shown in FIG. 1B at addresses (ADD) 0, 1, 2, ... in this sequence. The data are read out from the memory MEM in a desired sequence, that is, from the addresses 1, 3, 0, 7, 4, ..., for example. As a result, a data sequence CH2, CH4, CH1, CH8, CH5, ... is obtained, thereby completing the cross-connecting.

Figure 1B:
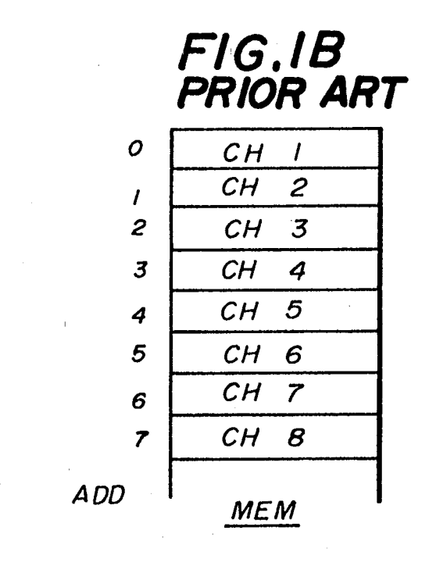
Figure 1C:
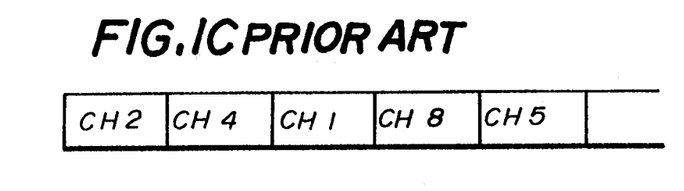

FIGS. 1A and 1C show multiplexed data, and the data CH1, CH2, ... are obtained time-sequentially in this sequence in FIG. 1A while the data CH2, CH4, ... are obtained time-sequentially in this sequence in FIG. 1C. FIGS. 1A and 1C show the data at each port, and if there are eight input/output ports, for example, CH1, CH2, ... respectively correspond to the data at input/output ports 1, 2, ....

If the data of eight channels are multiplexed at one input/output port, the cross-connecting may be carried out as shown in FIGS. 1A through 1C. However, when there are many input/output ports, the required memory capacity increases. The increase in the memory capacity results in the increase in the number of memories which are required, meaning an increase in hardware as will be described hereafter.

Figure 2:
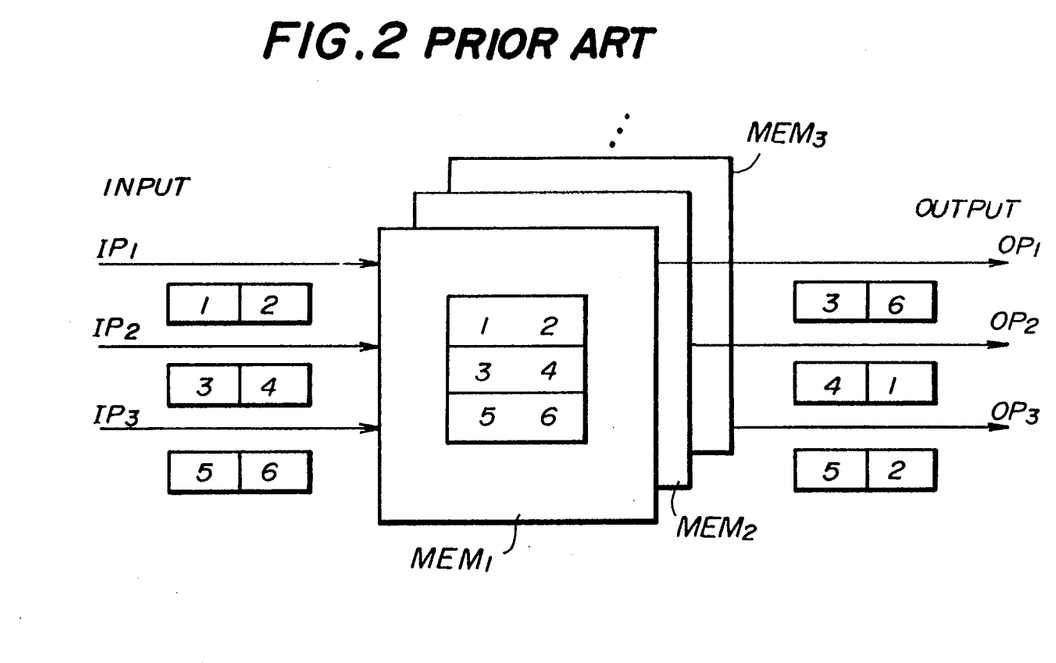
FIG. 2 is a diagram for explaining a conventional multi-port cross-connecting.

FIG. 2 shows an example where there are three input/output ports. In this example, data 1 and 2, data 3 and 4, and data 5 and 6 received at the three input ports IP1, IP2 and IP3 are cross-connected to data 3 and 6, data 4 and 1, and data 5 and 2 at the three output ports OP1, OP2 and OP3.

If only a single memory MEM1 were used for this cross-connecting, the data 1, 3 and 5 and the data 2, 4 and 6 would be written into the memory MEM1 in the received sequence according to the order of the input ports IP1 through IP3 which is from the top to bottom in FIG. 2. The data 3, 4 and 5 and the data 6, 1 and 2 would be read out from the memory MEM1 in this sequence to be output to a desired port via a selector (not shown). However, when only one memory MEM1 is used, the data 1, 3 and 5 are written by specifying a write address i, and the data 2, 4 and 6 are written by specifying a write address j. In addition, the data 1, 3 and 5 are read from the memory MEM1 by specifying a read address i and the data 2, 4 and 6 are read by specifying a read address j. In other words, the write and read addresses for the data 1, 3 and 5 are the same, and the write and read addresses for the data 2, 4 and 6 are the same. For this reason, although the data 3 and 5 can be read out from the memory MEM1 simultaneously, the data 4 cannot be read out at the same time as the data 3 and 5 because the data 4 is written at an address which is different from the addresses where the data 3 and 5 are written. Similarly, the data 1 cannot be read out at the same time as the data 2 and 6.

Therefore, if the combination of the input data and the output data are to be freely selected, it becomes necessary to provide three memories MEM1 through MEM3 in correspondence with the three output ports OP1 through OP3 with respect to one input port, and thus, nine ($3 \times 3$) memories are required with respect to three input ports IP1 through IP3. By providing nine memories, the data 1 and 2 received at the input port IP1 can be written into three memories in the received sequence and read out in an arbitrary sequence to be output to a desired output port. The data 3 and 4 received at the input port IP2 and the data 5 and 6 received at the input port IP3 are respectively written into three memories in a similar manner and output to desired output ports. Accordingly, the data received at the input ports IP1 through IP3 can be output to the desired ones of the output ports OP1 through OP3 in an arbitrary sequence or combination.

Of course, if the memory can carry out the write and read operations at a high speed, it is possible to cross-connect the data received at the multi-channel input ports to the output ports without using as many memories as described above. However, when the data received at the input ports are transmitted at a high speed, the memories must carry out the write and read operations at a speed higher than transmission speed of the received data, and it is difficult to find memories which can operate at sufficiently high speeds.

According to the conventional time switch element, only one word of data can be read at one time out of the data which are written in the memory. For this reason, when the data quantity is large, a large number of memories must be used depending on the number of ports. In other words, even if all of the data are written into one memory, the data cannot be read out simultaneously, and thus, a plurality of memories are used instead. The same data contents are written into these memories and used depending on the output ports used. Consequently, the hardware increases depending on the data quantity to be processed and the number of ports used.

SUMMARY OF THE INVENTION

Accordingly, it is a general object of the present invention to provide a novel and useful multi-port time switch element in which the problems described above are eliminated.

Another and more specific object of the present invention is to provide a multi-port time switch element for cross-connecting an n-channel multiplexed data comprising m input ports for receiving m n-channel multiplexed data, memory means, supplied with the n-channel multiplexed data via the m input ports, for alternately writing and reading the n-channel multiplexed data, m selector means, coupled to the memory means, for writing and reading the n-channel multiplexed data, each of the m selector means receiving $m \times n$ data read from the memory means and selecting one of the $m \times n$ data n times in an arbitrary sequence to output an n-channel multiplexed data, and m output ports for outputting the m n-channel multiplexed data read from the m selector means. According to the multi-port time switch element of the present invention, it is possible to considerably reduce the hardware compared to the conventional multi-port time switch element.

Other objects and further features of the present invention will be apparent from the following detailed description when read in conjunction with the accompanying drawings.

DESCRIPTION OF THE PREFERRED EMBODIMENTS

First a description will be given of a first embodiment of a multi-port time switch element according to the present invention, by referring to FIG. 3.

In this embodiment, it is assumed that an n-channel multiplexed data is input to m input ports IP1 through IPm. Memory elements (registers) 12 and 14 respectively have a memory capacity of n×m bits if each channel has one bit and n×m bytes if each channel has eight bits. Write and read operations are alternately carried out with respect to the memory elements 12 and 14, and a first selector 16 selectively outputs the data which are alternately read out from the memory elements 12 and 14. A second selector 18 is made up of m selector parts 18a, 18b, . . . , and each selector part selects one of the m n-channel multiplexed data.

Figure 3:
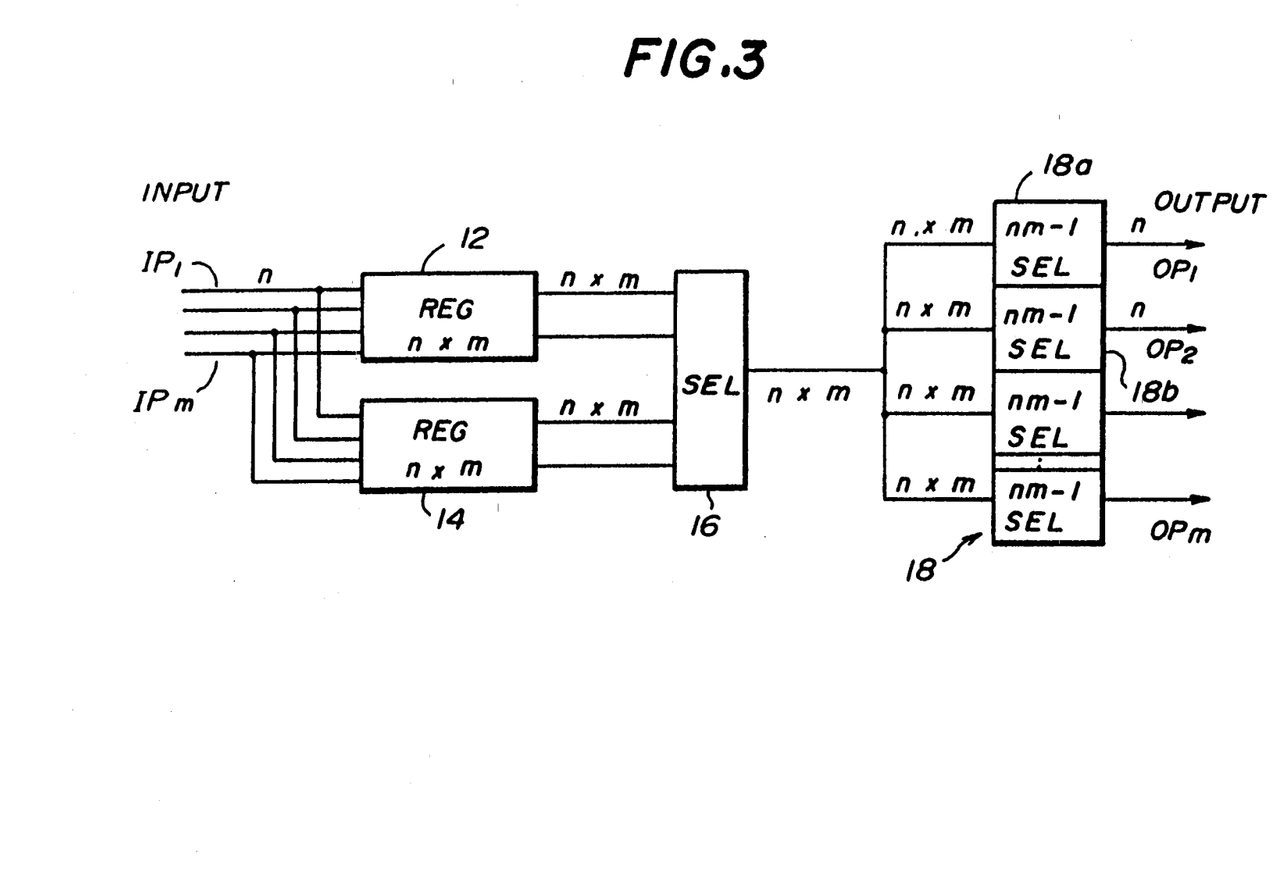
FIG. 3 is a system block diagram showing a first embodiment of the multi-port time switch element according to the present invention.

In FIG. 3, the memory elements 12 and 14 form a double buffer structure to which the input data is written alternately and from which the stored data is alternately read out. Accordingly, even if the input data is continuously input to the double buffer structure, the input data are alternately written into the memory elements 12 and 14 and the stored data can be read out alternately from the memory element 12 and 14 as a continuous output data, although each of the memory elements 12 and 14 can only carry out one of the write and read operations at one time.

If it is assumed for the sake of convenience that the stored data read out from each of the memory elements 12 and 14 has one bit per channel, n×m signal lines are provided in parallel, and the n×m signal lines are connected to each of m selector parts 18a, 18b, . . . . Each of the selector parts 18a, 18b, . . . couple specified n bits out of the n×m signal lines to corresponding output ports OP1 through OPm.

Further, if the input data received at each of the input ports P1 through Pm is a multiplexed data of two channels (n=2), the memory elements 12 and 14 both have 2 m output lines and the first selector 16 connects the 2 m input lines from which the stored data is read out from the memory element 12 or 14 to the 2 m output lines. One cycle of the operation of the second selector 18 ends when the operation of selecting one from 2 m lines is carried out by the selector parts 18a, 18b, . . . twice, and the specified input data is output to the desired output port. The desired cross-connecting is carried out in this manner without the need to considerably increase the hardware.

Figure 4:
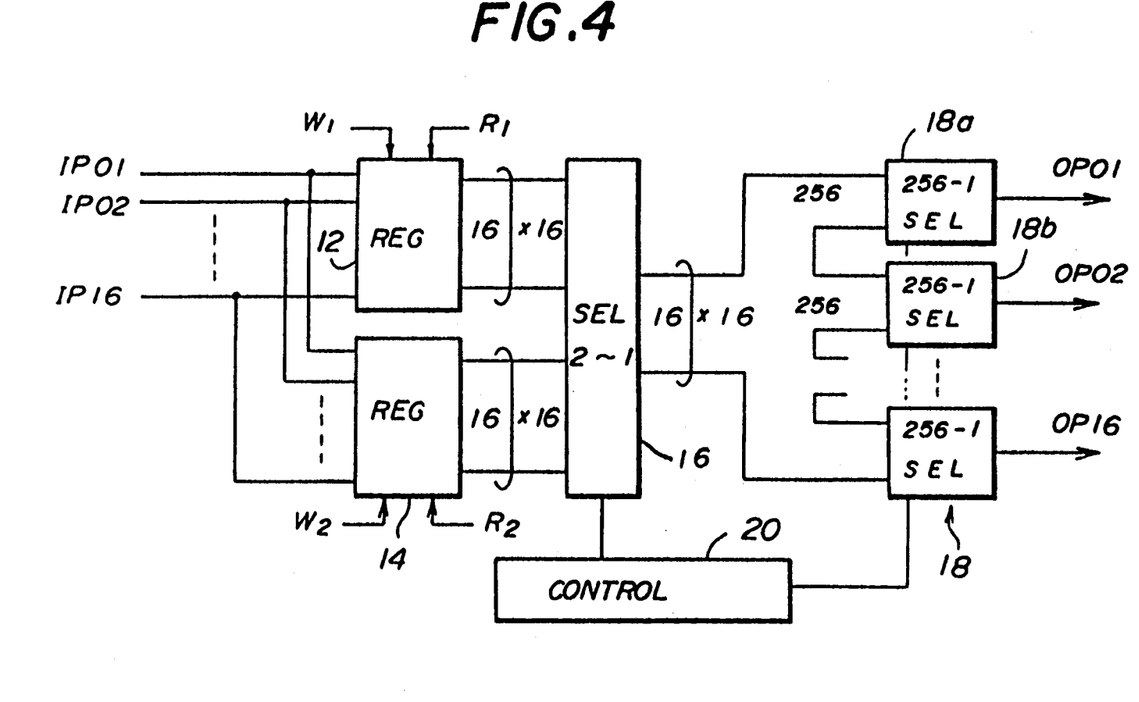
FIG. 4 is a system block diagram showing a second embodiment of the multi-port time switch element according to the present invention.
Figure 5:
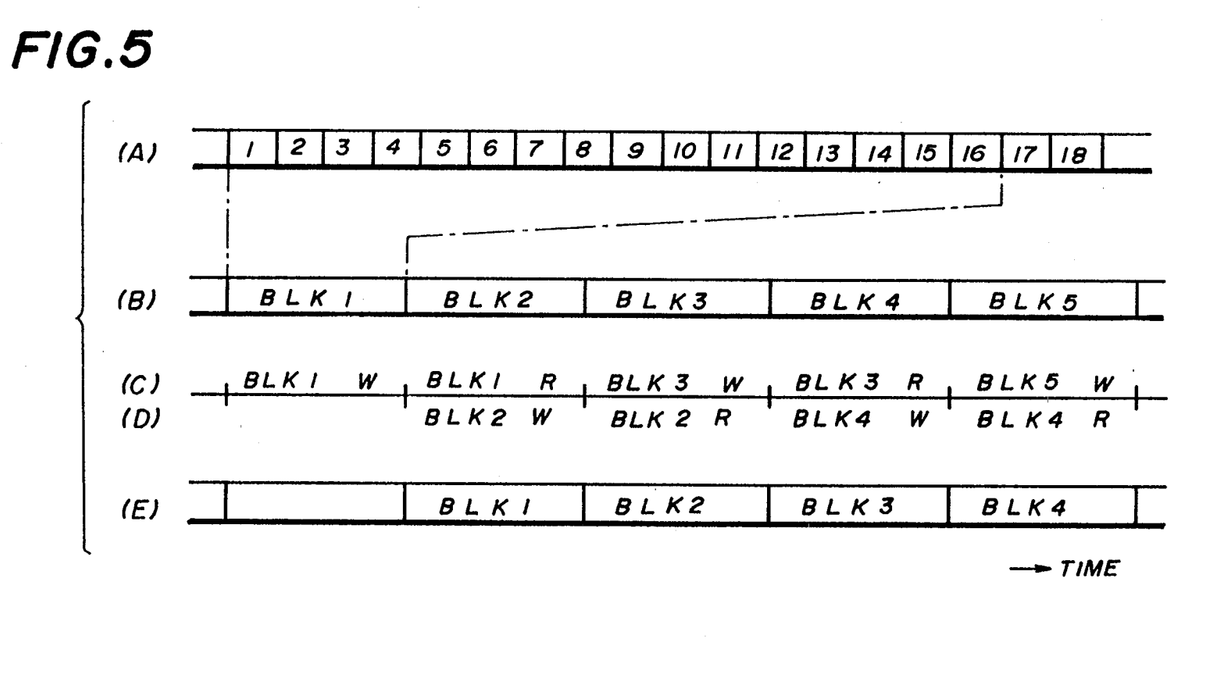
FIG. 5 is a time chart for explaining an operation of the embodiment shown in FIG.4.

Next, a description will be given of a second embodiment of the multi-port time switch element according to the present invention, by referring to FIGS. 4 and 5. FIG. 4 shows the second embodiment, and FIG. 5 shows a time chart for explaining an operation of the second embodiment. In FIG. 4, those parts which are the same as those corresponding parts in FIG. 3 are designated by the same reference numerals, and a description thereof will be omitted.

In this embodiment shown in FIG. 4, it is assumed for the sake of convenience that there are sixteen input ports IP01 through IP16 and sixteen output ports OP01 through OP16, and that the input data is a multiplexed data of sixteen channels (that is, n=16). In this case, if the data per channel is one bit, the registers 12 and 14 both have 16×16=256 bits, and the registers 12 and 14 both have 256 output lines. The read and write operations are carried out alternately by the registers 12 and 14. In other words, the register 14 carries out a read operation responsive to a read enable signal R2 when the register 12 carries out a write operation responsive to a write enable signal W1. On the other hand, the register 14 carries out a write operation responsive to a write enable signal W2 when the register 12 finishes the write operation and carries out a read operation responsive to a read enable signal R1.

The first selector 16 has 256 output lines, and the 256 output lines are connected to the 256 input lines from which the input data is read out from the register 12 or 14. In other words, the first selector 16 selectively outputs the data which is alternately read out from the registers 12 and 14 under the control of a double buffer controller 20. The second selector 18 is made up of 16 selector parts 18a, 18b, . . . , and selects one line from 256 lines. One cycle of the operation of the second selector 18 ends when this selection of one line from 256 lines is made 16 times. The input data to the input ports IP01 through IP16 is a 16-channel multiplexed data, and the output data output from the output ports OP01 through OP16 is a 16-channel multiplexed data. When each channel has 8 bits, the number of input signal lines of the first selector 16 is 16×16×8×2=4096, and the number of output signal lines of the first selector 16 is 16×16×8=2048. The term "×8" may be eliminated by employing a time-division.

The first selector 16 outputs 256 (=16×16) bits simultaneously in parallel based on the signals of one time slot of each of the 16 input ports (or signal lines) IP01 through IP16 which respectively receive the 16-channel multiplexed data. The 256-bit signal is supplied in common to each of the 16 selector parts 18a, 18b, . . . of the second selector 18. Each of the 16 selector parts 18a, 18b, . . . selects and outputs signal bits from the 256-bit signal under the control of the controller 20, so that 16 predetermined 16-channel multiplexed data are output from the output ports (or signal lines) OP01 through OP16.

FIG. 5 shows the operation of this embodiment for one port. FIG. 5(A) shows the input data received at one input port, and this input data is a 16-channel multiplexed data. As shown in FIG. 5(B), the data amounting to 16 channels are respectively regarded as blocks BLK1, BLK2, BLK3, . . . . As shown in FIG. 5(C) and (D), the block BLK1 is first written into the register 12. Then, the block BLK2 is written into the register 14, and at the same time, the block BLK1 is read out from the register 12. Next, the block BLK3 is written into the register 12, and at the same time, the block BLK2 is readout from the register 14. Thereafter, the write and read operations are alternately carried out in a similar manner. As a result, the blocks BLK1, BLK2, . . . are read out with a delay of one cycle with respect to the write operation. In FIG. 5(C) and (D), "W" denotes a write operation and "R" denotes a read operation.

According to the conventional system described before in conjunction with FIG. 2, a number of memories corresponding to the number of output ports is provided to form a memory group, and a number of memory groups corresponding to the number of input ports is provided. Hence, the same input data must be written into each memory group. Hence, only the data stored in one of the memory groups is used, and the data stored in the other memory groups are destroyed. Therefore, the utilization efficiency of the memory capacity is poor according to the conventional system.

However, according to this embodiment, the input data is written into the registers 12 and 14 without an overlap, and the data written into the registers 12 and 14 are all output to one of the output ports OP01 through OP16. Therefore, the utilization efficiency of the memory capacity is considerably improved compared to the above conventional system.

The first and second embodiments described above use the double buffer structure so that the signals within the block on the input side do not form another block on the output side when the time switch is made.

Figure 6A:
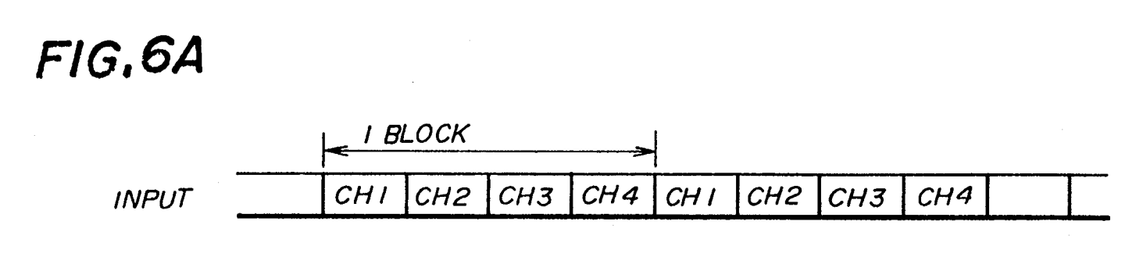
FIGS. 6A and 6B are diagrams for explaining a time switch.
Figure 6B:
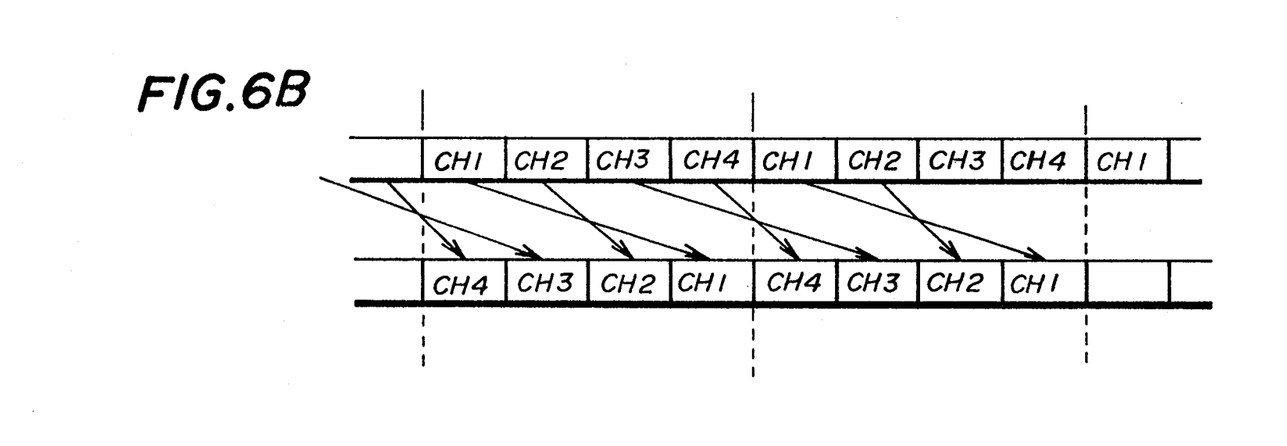

Let us assume that the multiplexed data is a 4-channel multiplexed data as shown in FIG. 6A and that the 4-channel data CH1, CH2, CH3 and CH4 of one block on the input side are switched into the channel data CH4, CH3, CH2 and CH1 on the output side. In this case, at the time when the channel data CH4 and CH3 are to be output, the channel data CH3 and CH4 of this block is not yet written on the input side. For this reason, it is only possible to output the channel data CH4 and CH3 of the immediately preceding block. However, when the channel data CH4 and CH3 of the immediately preceding block are output, the signal delay of the channel data CH1 and CH2 becomes different from the signal delay of the channel data CH3 and CH4. Therefore, this time switch is unsuited for use in a transmission system.

Figure 7:
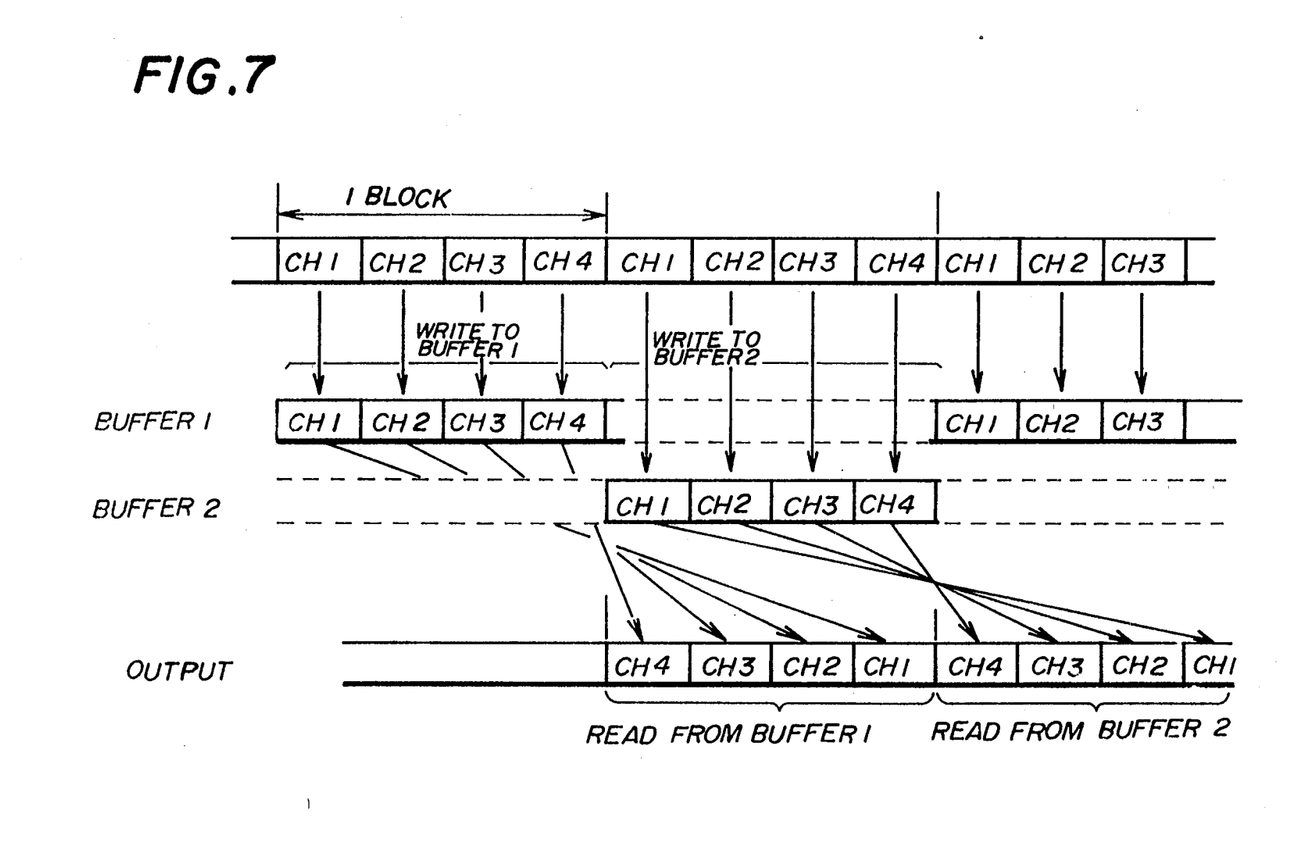
FIG. 7 is a diagram for explaining the effects of a double buffer structure employed in the first and second embodiments.

But when the double buffer structure is employed, the channel data which is output is always the channel data which is written during an immediately preceding block, as shown in FIG.7. For this reason, the signal delay of the channel data within the block which is output is constant, regardless of the time region in which the time switch is made.

Further, the present invention is not limited to these embodiments, but various variations and modifications may be made without departing from the scope of the present invention.

What is claimed is:

1. A multi-port time switch element for cross-connecting n-channel multiplexed data comprising:
   m input ports for receiving m n-channel multiplexed data;
   memory means, supplied with the n-channel multiplexed data via the m input ports, for alternately writing and reading the n-channel multiplexed data, wherein said memory means includes first and second registers, having n×m output lines, supplied with the n-channel multiplexed data via the m input ports, for alternately writing and reading the n-channel multiplexed data so that the first register writes the n-channel multiplexed data while the second register reads the n-channel multiplexed data which is already written and vice versa, and selection means for selectively outputting the n×m data alternatively read from the first and second registers;
   m selector means, coupled to said memory means, for writing and reading the n-channel multiplexed data, each of said m selector means receiving m×n data read from said memory means and selecting one of the m×n data n times in a predetermined sequence to output an n-channel multiplexed data, said selection means having n×m output lines which are operatively connected to said m selector means, each of said m selector means selecting data independently of each other, said n×m output lines being common to each of said m selector means; and
   m output ports for outputting the m n-channel multiplexed data read from said m selector means;
   wherein each of said m selector means selects and outputs signal bits from the n×m output lines so that pre-determined time switched cross-connected n-channel multiplexed data is output from said m output ports, and
   m is a number greater than 1.

2. The multi-port time switch element of claim 1 further comprising:
   control means, operatively connected to said selection means and said m selector means, for facilitating selection of one of the m×n data n times.

3. The multi-port time switch element of claim 1, wherein
   said first and second registers each include n×m memory cells, and
   each of said n×m memory cells of either said first and second registers is simultaneously directly connected to each of said n×m selectors through said n×m output lines of said selection means when said selection means respectively selectively outputs from said first and second registers.

4. The multi-port time switch element of claim 1, wherein
   said m selector means simultaneously output information stored from arbitrary cells among said n×m memory cells of either said first and second registers through said m output ports.

5. The multi-port time switch element of claim 1, wherein
   said first and second registers each include n×m memory cells, and
   each of said n×m memory cells of either said first and second registers is simultaneously directly connected to each of said n×m selectors through said n×m output lines of said selection means when said selection means respectively selectively outputs from said first and second registers.

6. The multi-port time switch element of claim 1, wherein
   said m selector means simultaneously output information stored from arbitrary cells among said n×m memory cells of either said first and second registers through said m output ports.

7. A multi-port time switch element for cross-connecting n-channel multiplexed data comprising:
  m input ports for receiving m n-channel multiplexed data;
  memory means, supplied with the n-channel multiplexed data via the m input ports, for alternately writing and reading the n-channel multiplexed data, wherein said memory means includes first and second registers, having $n \times m$ output lines, supplied with the n-channel multiplexed data via the m input ports, for alternately writing and reading the n-channel multiplexed data so that the first register writes the n-channel multiplexed data while the second register reads the n-channel multiplexed data which is already written and vice versa;
  selection means for selectively outputting the $n \times m$ data alternately read from the first and second registers;
  m selector means, coupled to said memory means, for writing and reading the n-channel multiplexed data, each of said m selector means receiving $m \times n$ data read from said memory means and selecting one of the $m \times n$ data n times in a predetermined sequence to output an n-channel multiplexed data, said selection means having $n \times m$ output lines which are operatively connected to said m selector means, each of said m selector means selecting and outputting signal bits from the $n \times m$ output lines;
  control means, operative to control said selection means and to control each of said m selector means to facilitate selecting one of the $m \times n$ data n times in an arbitrary sequence, said control means controlling the outputting of the selection means so that the predetermined time switched cross-connected n-channel data is output from said m ports; and
  m output ports for outputting the m n-channel multiplexed data read from said m selector means;
  wherein m is a number greater than 1.

8. A multi-port time switch element for cross-connecting n-channel multiplexed data comprising:
  m input ports connected to n channels;
  a first register having $n \times m$ cells connected to said m input ports and having $n \times m$ register output lines;
  a second register having $n \times m$ cells connected to said m input ports in parallel to said first register and having $n \times m$ register output lines;
  a first selector connected to the $n \times m$ output lines of both the first and second registers, said first selector having $n \times m$ selector output lines;
  m second selectors having $n \times m$ inputs alternatively directly connectable to said $n \times m$ cells of said first register and said second register through the $n \times m$ selector output lines, said m second selectors having m output ports
  wherein m is a number greater than 1.

* * * * *